Jan. 27, 1931. C. H. HAPGOOD Re. 17,941
SAFETY RAZOR
Original Filed Sept. 21, 1923 3 Sheets-Sheet 1
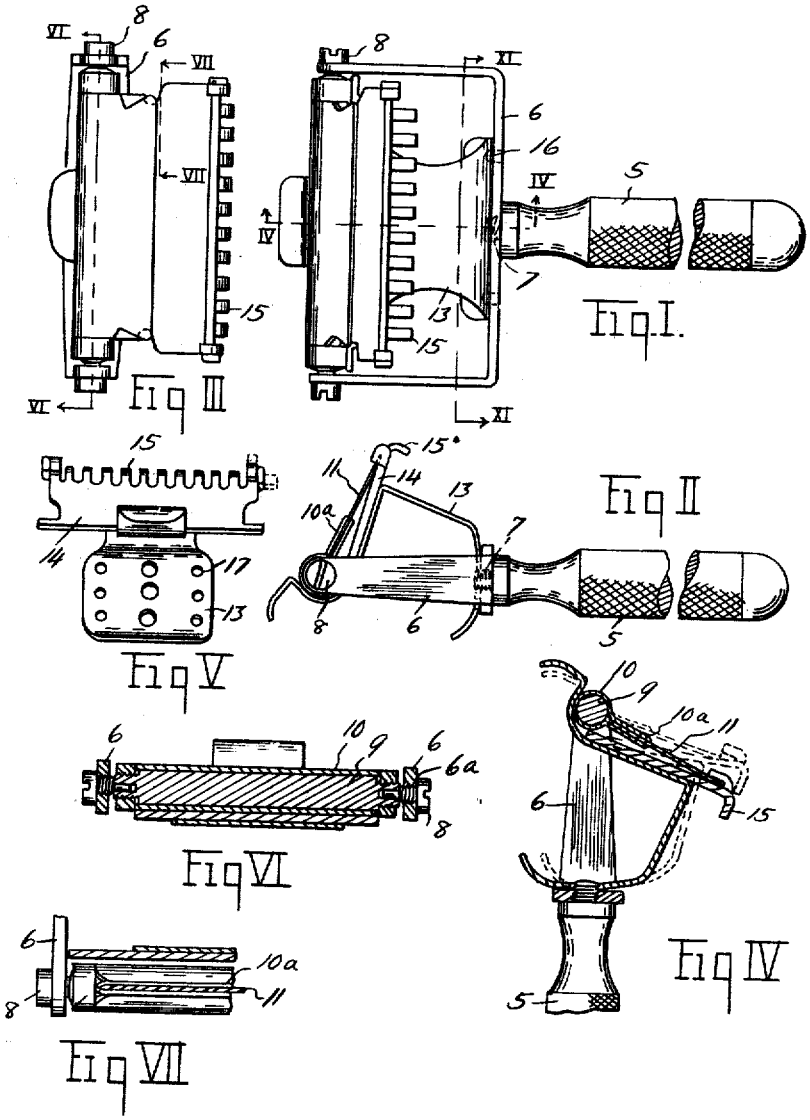
INVENTOR
Clarence H. Hapgood
BY
Rex Frye.
ATTORNEY Jan. 27, 1931. C. H. HAPGOOD Re. 17,941
SAFETY RAZOR
Original Filed Sept. 21, 1923 3 Sheets-Sheet 2
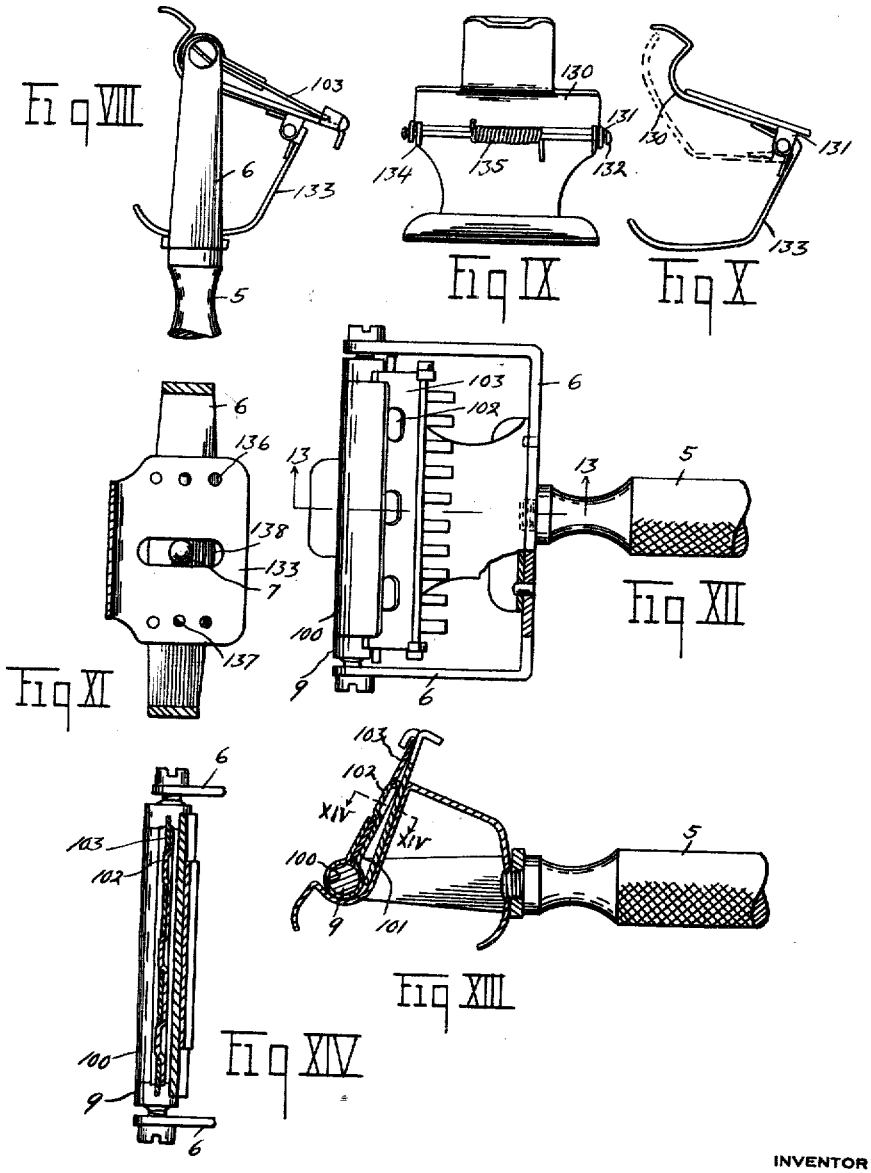
INVENTOR
Clarence H. Hapgood
BY
Rex Frye.
ATTORNEY Jan. 27, 1931. C. H. HAPGOOD Re. 17,941
SAFETY RAZOR
Original Filed Sept. 21, 1923 3 Sheets-Sheet 3
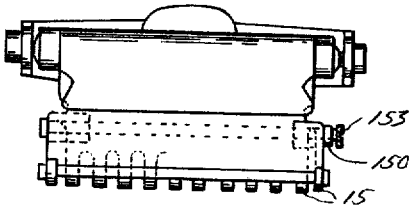
Fig. XV.
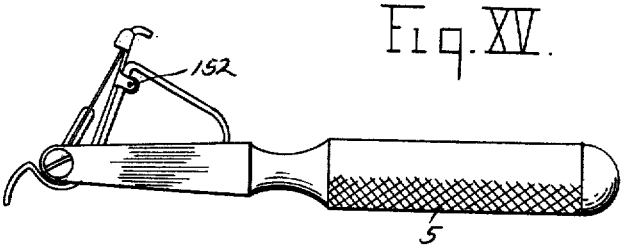
Fig. XVI.
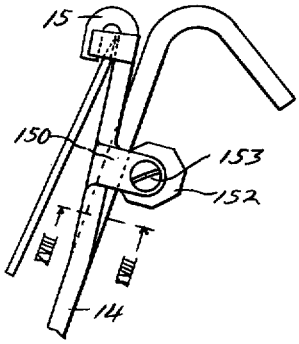
Fig. XVII.
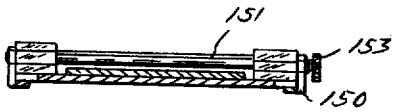
Fig. XVIII.
INVENTOR
Clarence H. Hapgood
BY
Rex Frye.
ATTORNEY Reissued Jan. 27, 1931

Re. 17,941

UNITED STATES PATENT OFFICE

CLARENCE H. HAPGOOD, OF TOLEDO, OHIO

SAFETY RAZOR

Original No. 1,644,187, dated October 4, 1927, Serial No. 663,996, filed September 21, 1923. Application for reissue filed October 17, 1929. Serial No. 400,416.

This invention relates to safety razors and has for its primary object the provision of a frame, comprising a handle and a holder, for pivotally supporting the blade for honing and stropping operations, and adapted to receive a detachable guard plate for supporting the blade during the shaving operation.

Another object of the invention is the arrangement of a resilient clamp for detachably securing the blades in correct position for honing, stropping and shaving, the clamp being mounted upon a pivoted carrier adapted to engage the surface of a hone or strop and guide the blade for efficient sharpening, the carrier holding the clamp at an angle rendering it possible to strop the blade upon a soft leather strop with the edge of the blade foremost against the strop the same as in honing.

A further object of the invention is the provision of a detachable guard member adapted to fit over the blade and be secured upon the frame in varying positions to control the angular relation of the blade to the handle.

A further object of the invention is the provision of a guard member having means for adjustably controlling the clearance space between the blade edge and the adjacent surface of the central teeth of the guard member, whereby the closeness with which the razor will shave may be varied at will.

A further object of my invention is the provision of a guard member which may be very quickly and easily attached to and detached from the blade by means of resilient portions of said guard adapted to frictionally engage about portions of the blade and its supporting clamp when manually placed thereon, without thereby interfering with the free rotatability of the blade about its axis of support, said guard also having means for adjustably connecting it with the frame at a point spaced from the axis of the blade, whereby said adjustment will move the blade and guard about their common axis.

Other objects and advantages will be apparent from the following description wherein reference is made to the accompanying drawings illustrating preferred embodiments of my invention, and wherein similar reference numerals designate similar parts throughout the several views.

In the drawings:—

Figure I is a front elevation of a safety razor constructed in accordance with my invention.

Figure II is a side elevation thereof.

Figure III is an end view thereof looking toward the blade end of the razor.

Figure IV is a transverse sectional view taken substantially on the line 4—4 of Figure I, with varying positions of the blade and guard member shown in dotted lines.

Figure V is an end view of the detachable guard member.

Figures VI and VII are detail sectional views taken substantially on lines 6—6 and 7—7 of Figure III.

Figure VIII is a side elevation of the frame and associated parts with a modified form of guard member.

Figure IX is a rear elevation of this guard member.

Figure X is a side elevation thereof.

Figure XI is a detail sectional view taken substantially on the line 11—11 of Figure I.

Figure XII is a front elevation of my improved razor constructed for use with double edged blades of the Gillette type.

Figure XIII is a central sectional view taken substantially on the line 13—13 of Figure XII.

Figure XIV is a detail sectional view taken substantially on the line 14—14 of Figure XIII.

Figure XV is an end view of my razor with provisions for adjusting the blade relatively to the guard plate.

Figure XVI is a side elevation thereof.

Figure XVII is an enlarged detail view showing in side elevation the guard teeth and blade adjusting means, and Figure XVIII is a detail sectional view taken substantially on the line 18—18 of Figure XVII.

Figure XIX is a plan view from above, of the top of the razor with the blade and blade-clamp removed, intended to bring out particularly the construction of the guard teeth in the adjustable embodiment of my invention, and the relation of the central to the endmost teeth.

Referring now to the drawings, the numeral 5 designates a handle and 6 a holder rigidly secured thereto in any expedient manner, as by the threaded stem 7, the whole comprising the frame. The holder is substantially U-shaped and provided with threaded apertures 6ª adjacent the ends of its tines for the reception of fulcrum screws 8 (see Figure VI), the inner extremities of the fulcrum screws being rounded and adapted to fit within the apertured ends of the blade carrier 9 to permit ready rotation of the carrier, as hereinafter described. Encircling the carrier 9 is a clamp 10 of resilient metal, the ends of which extend radially from the carrier 9 and are adapted to securely hold a razor blade 11 during the honing or stropping operations as well as during the shaving operation. To co-operate with blades that have notches adjacent their side edges, as do many of the single edged blades now in general use, I preferably form the clamping jaws 10ª of the clamp with inturned projecting portions adjacent their sides, (see Figures III and VII) the projecting portions fitting within the notches of the blade and serving to position the blade within the clamp. This prevents accidental movement of the blade within the clamp, and renders it easy to recognize when the blade is correctly positioned. Upon the ends of the carrier 9 are provided cylindrical nuts 12 (note Figure VI) which serve the purpose of retaining the clamp 10 in correct position upon the carrier 9 and also serve to provide a broader tractive surface upon the strop or hone.

The external diameter common to both the clamp 10 and the cylindrical nuts 12 is so related to the blade carried in the clamp 10, that if a line or plane were extended from the beveled cutting edge of the blade, back as a continuation thereof toward the clamp, the projected line or plane would be precisely tangent the periphery of the clamp and/or of the cylindrical nuts. Thus when resting upon the surface of a hone or strop the beveled edge of the blade lies flat thereon, while the surface of the strop or hone represents the projected extension of the beveled edge above referred to, and is tangent to the periphery of the clamp and nuts. By virtue of this construction it is possible to move the blade over the surface of the hone or strop with its edge foremost without cutting the strop or hone, even though flexible strops be used.

This is the correct position for sharpening razor blades and has been heretofore used in honing, but never in stropping, owing to the difficulty of moving a razor blade edge foremost over a flexible strop without cutting into the surface of the strop. The beveled edges of razor blades are ordinarily slanted substantially equally from the sides of the blade, and with such blades the movement of the blade over the strop or hone can be made in either direction.

The operation of honing or stropping would accordingly be carried out by merely resting the carrier upon the surface of the hone or strop, which is preferably kept in a substantially horizontal position, and the frame alternately pushed and pulled by pressure on the handle 5. The first movement of the carrier upon the surface of the hone or strop serves to turn the clamp and blade to bring the beveled edge of the blade into frictional contact with the hone or strop. This position is then maintained during the remainder of the stroke in one direction, the friction of the carrier against the strop or hone serving to maintain the edge of the blade in close contact with the surface. As soon as the handle is moved in the opposite direction the friction on the periphery of the carrier serves to rotate the clamp and blade until the opposite side of the beveled edge of the blade is in frictional contact with the strop or hone, whereupon further movement in that direction may be made with the beveled edge in engagement with the surface. These alternate movements over the strop or hone can be continued as long as desired.

The blade can now be used for shaving without detaching it from the clamp 10, by the positioning of a guard structure substantially as shown in Figures I to V. The guard structure in the form there illustrated, comprises a guard member 14 having rounded and downturned teeth 15 at one end, and a securing member 13 of resilient material adapted to snap into position against the clamp and the inner face of the holder 6. The guard member 14 and securing member 13 are preferably welded or otherwise suitably united so as to form a substantially integral piece. The angle at which the blade 11 is held relatively to the handle 5 may be adjusted in various ways to suit the convenience, but in this instance I have shown a plurality of aligned apertures 17 and 17′ in the securing member 13, the central apertures 17 being adapted to fit over the threaded stem 7 of the handle 5, and the side apertures being adapted to fit over studs 16 extending from the inner surface of the holder 6, substantially as shown in Figures I and V. The endmost guard teeth 15′ are preferably bent upwardly and over the sides of the blade to serve in positioning the blade upon the guard member and aid the projecting portions of the clamping jaws in preventing lateral movement of the blade within the clamp. The free extremity of the securing member 13 is preferably curved to facilitate the positioning of the guard structure within the holder.

In Figures VIII to XI inclusive is shown a slightly modified embodiment of the guard structure whereby the razor blade is positioned within the frame for shaving. This form of guard structure comprises substantially the same guard member 14 welded or otherwise secured to a metallic strip 130 curved at its upper extremity to snugly fit over the clamp, and formed with apertured ears 131 for the reception of a pivot pin 132 upon which is pivotally connected a positioning strip 133 by apertured ears 134. A coil spring 135 is mounted upon the pivot pin 132 with its ends engaging the strips 130 and 133 respectively to normally force them apart. The positioning strip 133 is provided with a plurality of spaced aligned openings 136 for adjustment relatively to the holder 6. As illustrated in Figure XI the adjusting openings 136 may be arranged adjacent each side of the strip 133 to co-operate with pins 137 on the holder, a central slot 138 being utilized to enable adjustment relatively to the threaded stem 7 whereby the handle 5 is secured to the holder.

In Figures XII to XIV inclusive is shown an embodiment of the invention whereby double edged blades of the Gillette type may be employed. Substantially the same frame, guard member and carrier are employed as is illustrated in Figures I to VII inclusive, but the clamp 100 is formed with one of its jaws 101 of greater length than the other jaw and provided with spaced raised portions 102 to fit within the apertures in the blade 103. The raised portions 102 correctly position the blade 103 within the clamp and are spaced a sufficient distance from the carrier 9 to prevent the edge of the blade within the clamp from contacting the carrier.

The portion of the guard member comprising the central teeth 15 is preferably arranged parallel with the blade adjacent the cutting edge thereof and in spaced relation thereto, as is clearly shown in the enlarged Figure XVII, thereby providing a slight clearance space between the blade and the adjacent surface of said teeth. If desired, provision may be made for slightly moving the blade toward or away from the central teeth of the guard member, thus varying the extent of this clearance space to suit the preference of the user. This may be accomplished in various ways, but in Figures XV to XVIII I have shown means for adjustably warping or flexing portions of the guard member, thereby causing movement of the cutting edge of the blade relatively to the guard in a direction substantially perpendicular to the adjacent surface of the central teeth of the guard member, thus varying the extent of the clearance space between them. For this purpose, the guard member is preferably made of resilient material, and is designed in such manner that a line of cleavage is established between the endmost teeth 15′ and the central portion of the guard carrying the teeth 15, as shown in Figure XIX; thus the endmost teeth constitute arms which may be flexed or warped relatively to the central portion of the guard. To this end the arms carrying the endmost guard teeth 15′ are provided with downturned apertured ears 150 for the reception of the stub shaft 151 on which are eccentrically mounted the adjusting members or rollers 152, which constitute in effect enlarged portions of the stub-shaft and which obviously, if preferred, might be formed as a single member or roller which might be positioned near the center or run substantially the entire length of the stub-shaft. These members are preferably constructed with a plurality of like faces spaced at different distances from the stub shaft 151, whereby, when the several faces are brought into contact with the lower surface of the central portion of the guard carrying the teeth 15, the endmost teeth 15′ are flexed relatively thereto, substantially as shown in Figure XVII, the flexing of the endmost teeth serving to move the blade slightly about its pivotal mounting on the carrier, thus increasing or decreasing, as the case may be, the clearance space between the cutting edge of the blade and the adjacent surface of the central teeth 15 of the guard member. It will be understood that the arms carrying the endmost teeth 15′ are normally flexed beyond or above the position corresponding to the least effective face of the members 152, that is, the face of the adjusting rollers 152 nearest the center of the stub-shaft, so that the resiliency of the arms will hold the members 152 firmly in contact with the underneath surface of the guard member. A knurled handle 153 is provided for ready rotation of the adjusting member 152. The adjusting device is carried by the guard member 14 and may be removed with the guard member when it is desired to strop or hone the blade. While this construction as herein shown may be considered as a preferred form, similar results may be satisfactorily obtained with other forms without departing from the principle of warping a portion of the guard member to vary the clearance space between the blade edge and the central teeth of the guard member. After the desired adjustment of the clearance space between the cutting edge of the blade and the central guard teeth is once secured it may be held indefinitely, even though new blades be utilized with the guard member.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim:

1. In a safety razor, a frame comprising side members and a transverse member connecting said side members, a blade, means for pivotally supporting said blade on said side members on an axis spaced from said transverse member, a guard having portions arranged to engage and support the cutting edge of said blade, and having other portions extending adjacent said cutting edge, and means for warping the first mentioned portions whereby the distance between the cutting edge and the last mentioned portions may be selectively varied.

2. In a safety razor, a frame comprising side members and a transverse member connecting said side members, means for pivotally supporting a blade on said side members on an axis spaced from said transverse member, a guard structure of relatively resilient material supported on said blade and its support without affecting the free rotatability thereof, by frictional engagement thereabout, said guard having portions affixed to and extending adjacent the cutting edge of said blade, and means for flexing a portion of said resilient guard to selectively vary the clearance between said cutting edge and that portion of the guard which is adjacent thereto.

3. In a safety razor, a frame comprising side members and a transverse member connecting said side members, a blade, means for pivotally supporting said blade on said side members on an axis spaced from said transverse member, and a guard having a portion arranged to engage the cutting edge of said blade and having other portions arranged between the axis of said blade and said transverse member, one of the last mentioned portions being arranged for pivotal connection with said frame about the axis of said blade, and another of said last mentioned portions having means for adjustably connecting the same with said frame, whereby the relation of said guard to said frame may be varied.

4. In a safety razor, a frame comprising side members and a transverse member connecting said side members, a blade, means for pivotally supporting said blade on said side members on an axis spaced from said transverse member, and a guard having a portion arranged to engage the cutting edge of said blade and having other portions arranged between the axis of said blade and said transverse member, one of the last mentioned portions being arranged for pivotal connection with said frame about the axis of said blade and another of said last mentioned portions being arranged to connect with said frame at a point spaced from the axis of said blade.

5. In a safety razor, a frame comprising side members and a transverse member connecting said side members, means for pivotally supporting a blade on said side members on an axis spaced from said transverse member, and a guard having a part arranged to engage the cutting edge of said blade and having other parts arranged between the axis of said blade and said transverse member and yieldably connected one to the other, one of the last mentioned parts having means for pivotally connecting the same with said frame about the axis of said blade, and the other of said last mentioned parts having means for adjustably connecting the same with the transverse member of said frame whereby the adjustment of the last mentioned part will move said blade about its axis.

6. In a safety razor, a frame comprising a holder and a handle rigidly secured thereto, said holder having side members and a transverse member, a blade, means for pivotally supporting said blade in said holder on an axis spaced from said transverse member, a guard having a portion arranged to engage and support the cutting edge of said blade, and having another portion extending adjacent said cutting edge, and means carried by one of said portions to vary the proximity of said last mentioned portion to said cutting edge.

7. In a safety razor, a frame comprising a holder and a handle rigidly secured thereto, said holder having side members and a transverse member, a blade, means for pivotally supporting said blade in said holder on an axis spaced from said transverse member, a guard having portions arranged to engage and support the cutting edge of said blade and having other portions extending adjacent said cutting edge, and means carried by said first mentioned portions to vary the proximity of said other portions to said cutting edge.

8. In a safety razor, a frame comprising a holder and a handle rigidly secured thereto, said holder having side members and a transverse member, a blade, means for pivotally supporting said blade in said holder on an axis spaced from said transverse member, a guard of relatively resilient material having portions arranged to engage the cutting edge of said blade, and having other portions extending adjacent said cutting edge, and means for flexing the first mentioned portions, whereby the proximity of the cutting edge to the last mentioned portions may be selectively varied.

9. In a safety razor, a frame comprising a holder and a handle rigidly secured thereto, said holder having side members and a transverse member, a blade, means for pivotally supporting said blade in said holder on an axis spaced from said transverse member, a guard of relatively resilient material having portions arranged to support said guard on said blade and having other portions extending adjacent the cutting edge of said blade, and means for flexing one or more portions of said guard relative to said last mentioned portions, whereby the proximity of said last named portions to the cutting edge of said blade may be selectively varied.

10. In a safety razor, a frame comprising a holder and a handle rigidly secured thereto, said holder having side members and a transverse member connecting said side members, a blade, means for pivotally supporting said blade in said holder on an axis spaced from said transverse member, and a guard structure having a portion arranged to engage the cutting edge of said blade and having other portions arranged between the axis of said blade and said transverse member, one of the last mentioned portions being arranged for pivotal connection with said frame about the axis of said blade, and another of said last mentioned portions having means for adjustably connecting the same with said frame, whereby the angular relation of said guard structure to said frame may be selectively varied.

11. In a safety razor, a frame comprising a holder and a handle rigidly secured thereto, said holder having side members and a transverse member connecting said side members, a blade, means for pivotally supporting said blade on said side members on an axis spaced from said transverse member, and a guard structure having a portion arranged to engage the cutting edge of said blade and having other portions arranged between the axis of said blade and said transverse member, one of the last mentioned portions being arranged for pivotal connection with said frame about the axis of said blade, and another of said last mentioned portions being arranged to connect with said frame at a point spaced from the axis of said blade.

12. In a safety razor, a frame comprising a holder and a handle rigidly secured thereto, said holder having side members and a transverse member connecting said side members, a blade, means for pivotally supporting said blade, in said holder on an axis spaced from said transverse member, and a guard structure having a part arranged adjacent to the cutting edge of said blade and having other parts arranged between the axis of said blade and said transverse member and yieldably connected one to the other, one of the last mentioned parts having means for pivotally connecting the same with said frame about the axis of said blade and the other of said last mentioned parts having means for adjustably connecting the same with said frame, whereby the adjustment of said last mentioned parts will move said blade about its axis.

13. In a safety razor, a frame comprising a holder and a handle rigidly secured thereto, said holder having side members and a transverse member connecting said side members, a blade, means for pivotally supporting said blade on said side members on an axis spaced from said transverse member, and a guard structure having a portion arranged to engage the cutting edge of said blade and having another portion arranged adjacent said cutting edge, means carried by one of said portions to vary the relation of said last mentioned portions to said cutting edge, said guard structure having means for pivotal connection with said frame about the axis of said blade, and having other means for adjustably connecting said guard with said frame whereby the relation of said guard to said frame may be varied.

14. In a safety razor, a frame comprising side members and a transverse member connecting said side members, a blade, means for pivotally supporting said blade on said side members on an axis spaced from said transverse member, a guard structure having portions arranged to engage the cutting edge of said blade and having other portions arranged adjacent said cutting edge, means carried by said first mentioned portions to vary the relation of said other portions to said cutting edge, said guard structure also having means for pivotal connection with said frame about the axis of said blade and having other means for connecting said guard with said frame at a point spaced from the axis of said blade.

15. The combination, in a safety razor, of a blade, a guard of relatively resilient material having a portion extending adjacent the cutting edge of said blade, and means for flexing a portion of said guard, whereby the proximity of that portion of the guard adjacent the cutting edge to said cutting edge may be selectively varied.

16. In a safety razor, a frame comprising a holder and a handle rigidly secured thereto, said holder having side members and a transverse member connecting said side members, a blade, means for pivotally supporting said blade between said side members on an axis spaced from said transverse member, a guard structure of relatively resilient material supported on said blade without thereby affecting the free rotatability thereof, by frictional engagement of portions of said guard about said blade and its support, and said guard having other portions for adjustable connection with said frame, whereby such adjustment enables the selective variation of the angular relation of said guard and said blade to said frame.

17. In a safety razor, a frame comprising side members and a transverse member connecting said side members, a blade, means for pivotally supporting said blade in said side members on an axis spaced from said transverse member, a guard structure of relatively resilient material supported on said blade and its support without affecting the free rotatability thereof, by frictional engagement thereabout, said guard having portions affixed to and extending adjacent the cutting edge of said blade, means for flexing a portion of said resilient guard whereby the proximity of that portion of the guard adjacent the cutting edge to said cutting edge may be selectively varied, and said guard having other portions for adjustable connection with said frame, whereby such adjustment enables the selective variation of the angular relation of said guard and blade to said frame.

18. In a safety razor, a frame comprising a holder and a handle rigidly secured thereto, said holder having side members and a transverse member connected with said side members, a blade, means for pivotally supporting said blade between said side members on an axis spaced from said transverse member, a guard structure of relatively resilient material supported on said blade without thereby affecting the free rotatability thereof, by frictional engagement of portions of said guard about said blade and its support, said guard having other portions for adjustable connection with said frame, whereby such adjustment enables the selective variation of the angular relation of said guard and blade to said frame, and means carried by said guard structure for varying the proximity thereto of the cutting edge of said blade.

19. In a safety razor comprising a supporting structure and a blade carried by said structure, a guard having an intermediate portion arranged in guarding relation to the cutting edge of said blade, and end portions having supporting connection with said blade, said intermediate portion and said end portions being relatively adjustable transversely to the plane of said blade, and means for adjusting said portions of said guard to vary the clearance between the intermediate portion of said guard and the cutting edge of said blade.

20. In a safety razor comprising a supporting structure and a blade carried by said structure, a guard having an intermediate portion arranged in guarding relation to the cutting edge of said blade and having end portions engaging said blade adjacent to the cutting edge thereof and movable transversely to the plane of said blade with relation to said intermediate portion, and means for adjusting said end portions with relation to said intermediate portion to move the cutting edge of said blade toward or from the intermediate portion of said guard.

21. In a safety razor comprising a supporting structure and a blade carried by said structure, a guard having an intermediate portion arranged in guarding relation to the cutting edge of said blade and having end portions engaging said blade adjacent to the cutting edge thereof and movable transversely to the plane of said blade with relation to said intermediate portion, and means carried by said end portions and acting on said intermediate portion to impart movement to said end portions and adjust said blade with relation to said intermediate portion.

22. A safety razor having a frame, a blade carrier pivoted therein and having a portion forming a hub, a beveled edge blade adapted to be secured in the carrier with the beveled edge portion of the blade tangential to the periphery of the hub portion of the blade carrier, and a detachable guard plate arranged to engage the frame, the carrier, and the sides of the blade to secure the blade and carrier in predetermined angular relation to the frame.

23. A safety razor having a frame, a blade carrier pivoted therein, means for securing a blade in the carrier with the beveled edge portion of the blade tangent to the periphery of the blade carrier, and a detachable guard plate adapted to secure the blade and carrier in predetermined angular relation to the frame, the guard plate being provided with a series of adjusting apertures for varying the angular relation of the blade and frame.

24. A safety razor having a frame, a blade carrier pivoted therein, a blade, and a detachable guard plate adapted to engage the edges of the blade, the carrier and the frame, the guard plate having a plurality of adjusting openings and a stud upon the holder frame adapted to fit within said openings.

25. A safety razor having a frame, a blade carrier pivoted therein, a blade, and a detachable guard plate adapted to engage the edge of the blade, the carrier and the frame, and means upon the blade carrier for correctly positioning the blade therein.

26. A safety razor having a frame, a rotatable carrier pivoted therein, a blade securing clamp mounted over the carrier, a detachable blade, and means for securing the blade and carrier in predetermined angular relation to the frame comprising a guard plate adapted to engage the blade, the clamp and frame, and means for adjustably securing the guard plate upon the frame.

27. A safety razor having a frame, a rotatable carrier pivoted therein, a blade securing clamp mounted upon the carrier, a detachable blade, and means for securing the blade and carrier in predetermined angular relation to the frame comprising a guard plate adapted to engage the blade, the clamp and frame, and means to warp the guard plate for moving the blade relatively to the guard plate.

28. A safety razor having a frame, a rotatable carrier pivoted therein, a blade securing clamp mounted upon the carrier, a detachable blade, and means for securing the blade and carrier in predetermined angular relation to the frame comprising a guard plate adapted to engage the blade and frame, and means for warping the guard plate for adjusting the distance of the edge of the blade from portions of the guard plate.

29. A safety razor having a frame, a rotatable carrier pivoted therein, a blade securing clamp mounted upon the carrier, a detachable blade, and means for securing the blade and carrier in predetermined angular relation to the frame comprising a guard plate adapted to engage the blade and frame, and an eccentric mounted upon the guard plate to move portions of the guard plate relatively to the remainder thereof to move the blade toward or from the major portion of the guard plate.

30. A safety razor having a frame, a handle adapted to be secured thereto, a carrier pivoted in the frame, a clamp mounted on the carrier, cylindrical members secured on the carrier at each end of the clamp, a blade adapted to be secured in the clamp, and a detachable guard plate adapted to secure the blade in predetermined angular positions relatively to the frame.

31. A safety razor having a frame, a handle adapted to be secured thereto, a carrier pivoted in the frame, a clamp mounted on the carrier, cylindrical members secured on the carrier at each end of the clamp, a blade adapted to be secured in the clamp, and a detachable guard member comprising a plate having teeth adapted to engage the edge of the blade and a securing member adapted to engage the frame.

32. A safety razor having a frame, a handle adapted to be secured thereto, a carrier pivoted in the frame, a clamp mounted on the carrier, cylindrical members secured on the carrier at each end of the clamp, a blade adapted to be secured in the clamp, and a detachable guard member comprising a plate having teeth adapted to engage the edge of the blade and a securing member adapted to engage the frame, and means carried by the guard member for adjusting the position of the cutting edge of the blade relatively to the guard teeth.

33. A safety razor having a frame, a handle adapted to be secured thereto, a carrier pivoted in the frame, a clamp mounted on the carrier, cylindrical members secured on the carrier at each end of the clamp, a blade adapted to be secured in the clamp, and a detachable guard member comprising a plate having teeth adapted to engage the edge of the blade and a securing member adapted to engage the frame, and a roller eccentrically mounted on the guard plate and adapted to move the blade toward or from the guard teeth.

CLARENCE H. HAPGOOD.

CERTIFICATE OF CORRECTION.

Reissue Patent No. 17,941. Granted January 27, 1931, to

CLARENCE H. HAPGOOD.

It is hereby certified that error appears in the above numbered patent requiring correction as follows: In the drawings, Fig. V, Sheet 1, and Figs. XV and XVII, Sheet 3, should appear as shown below instead of as shown in the drawings. The Fig. XIX should appear as shown below as part of the patent.

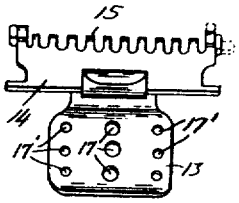

Fig V

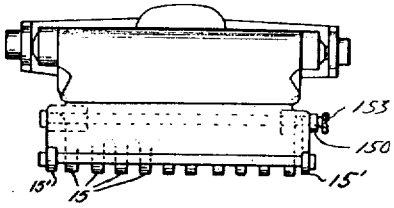

Fig. XV

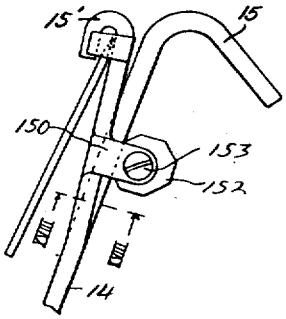

Fig. XVII.

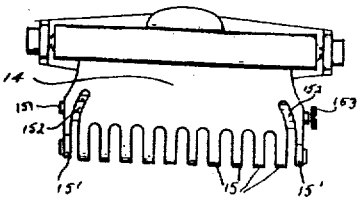

Fig XIX and that the said Letters Patent should be read with these corrections therein that the same may conform to the record of the case in the Patent Office.

Signed and sealed this 22nd day of December, A. D. 1931.

(Seal)

M. J. Moore,
Acting Commissioner of Patents.